No. 618,226. Patented Jan. 24, 1899.
J. B. GILBERT.
MILK HEATER.
(Application filed Aug. 18, 1897.)
(No Model.)
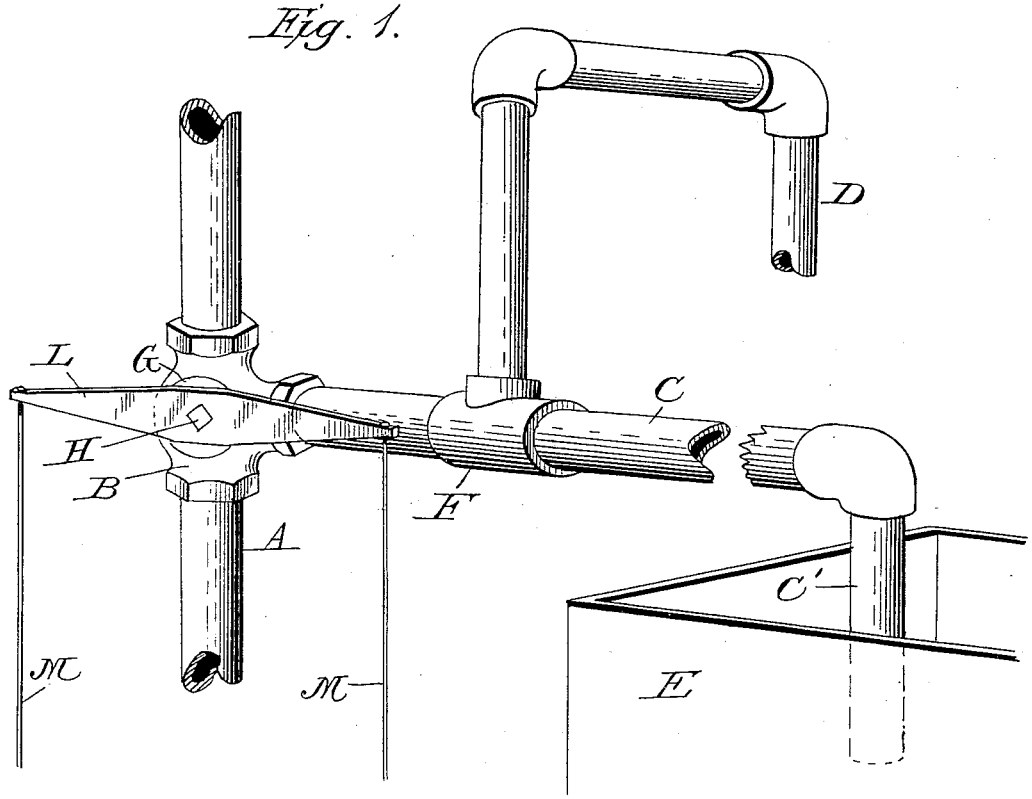
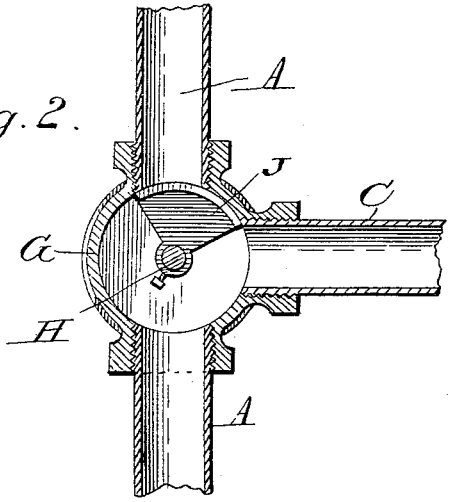
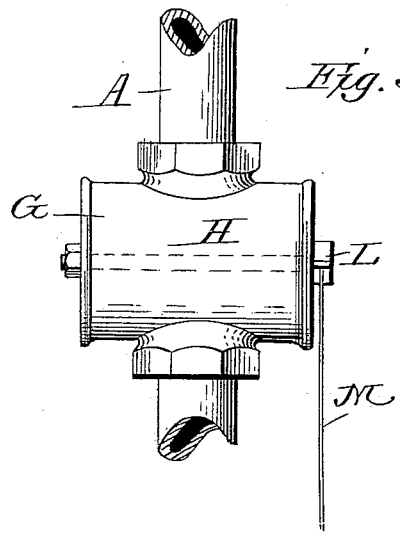
Witnesses
Franck L. Ourand.
George J. Weber.
Inventor
John B. Gilbert
By John C. Manahan
Attorney

UNITED STATES PATENT OFFICE.

JOHN B. GILBERT, OF STERLING, ILLINOIS.

MILK-HEATER.

SPECIFICATION forming part of Letters Patent No. 618,226, dated January 24, 1899.

Application filed August 18, 1897. Serial No. 648,636. (No model.)

*To all whom it may concern:*

Be it known that I, JOHN B. GILBERT, a citizen of the United States, residing at Sterling, in the county of Whiteside and State of Illinois, have invented certain new and useful Improvements in Skimmed-Milk Heaters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is the production of a novel skimmed-milk heater of the class designed to cook and sterilize milk by intermingling it with steam, which latter constitutes a propelling agent for causing the milk to flow through a conduit, within which it is heated before entering its ultimate receptacle. I attain these purposes by the construction illustrated in the accompanying drawings, in which—

Figure 1 is a perspective of the main parts employed. Fig. 2 is a detail in section of the mechanism for diverting the steam from the exhaust-pipe into the pipe which receives the milk to be cooked. Fig. 3 is a side elevation of a case or cylinder containing the aforesaid mechanism.

Similar letters refer to similar parts throughout the several views.

A is the pipe for conveying the exhaust-steam.

B is a T seated on the pipe A at a suitable height, preferably and often necessarily at an altitude that the pipe leading laterally therefrom may be out of the way of contact with persons operating in the room below it and enter the milk-vat at or near the top of the latter.

C is a pipe connecting at one end with the interior of B and extending some distance and at its opposite end C' turned down into the interior of the milk-vat E.

D is a tube through which the skimmed milk is forced by steam or other power into the tube C. A suitable T F is seated on the tube C to afford communication from the interior of the tube D to the interior of the tube C. The tube C is of sufficient length between its junction with the exhaust-pipe A and the milk-vat E that the steam and milk may be long enough together in passing to the milk-vat to enable the steam to cook the milk in such passage. For the same object the T F is seated near the exhaust-pipe end of the tube C.

In that portion of B which is seated on the pipe A is formed a cross-cylinder G, and axially thereof there is journaled a shaft H, extending at each end through the ends of G. On the shaft H is rigidly placed the segmental cut-off J, adapted to optionally close or open the communication through the wall of G with the tube C and a like opening communicating from the interior of cylinder G up to the upper portion of the exhaust-pipe A. A transverse lever L is rigidly seated centrally on the end of shaft H, exterior to the cylinder G, and is provided at each end with descending wires or ropes M, by means of which the segment J is caused to optionally close the upper portion of the exhaust-pipe A or the tube C. The lever L is placed parallel with the lower line of the segment J, and therefore can at all times be operated intelligently for the above purpose.

The operation of my invention is as follows: The exhaust-steam passing up the pipe A is diverted by means of the rocking segment J into the tube C. At the point of junction between the milk-tube D, preferably of one-half of the size of the tube C, with the latter tube the steam meets and intermingles with the said milk and carries the latter through the residue of the tube C into the milk-vat E.

What I claim as my invention, and desire to secure by Letters Patent of the United States, is—

The combination with a three-way-valve casing, of steam-pipes communicating with the casing and in axial alinement, a vat, a heating-pipe communicating at one end with the three-way-valve casing at right angles to the steam-pipe and provided at its opposite ends with a vertical branch extending into the vat, a milk-supply pipe of smaller diameter than the heater-pipe and communicating therewith adjacent to the valve-casing, a segmental valve within the valve-casing, a rock-shaft supporting said valve, a lever secured medially to the extremity of the rock-shaft upon the exterior of the valve-casing, and cords secured respectively to the extremities of the lever, substantially as specified.

In testimony whereof I affix my signature in presence of two witnesses.

JOHN B. GILBERT.

Witnesses:
   ISABELLE MANAHAN,
   ALICE JOHNSON.